May 13, 1958  W. M. PIETRUSZKA  2,834,594
ONE PIECE FORMED SINUOUS SPRING
Filed Feb. 18, 1957

INVENTOR.
Walter M. Pietruszka
BY
Harry Jacobson
ATTORNEY

United States Patent Office 2,834,594
Patented May 13, 1958

2,834,594
ONE PIECE FORMED SINUOUS SPRING

Walter M. Pietruszka, Brooklyn, N. Y., assignor to Kay Manufacturing Corporation, Brooklyn, N. Y., a corporation of New York Application February 18, 1957, Serial No. 640,745

5 Claims. (Cl. 267—1)

This invention relates to the sinuous wire springs employed in upholstered seats and backs and particularly to the form of the spring.

Attempts have previously been made to provide a yieldable support or soft edge at the upper part of the back of an article of furniture, but the structures involved in such attempts have been relatively expensive or inefficient because they have required undue labor in the assembly thereof or require separate reinforcing members held by clips at selected points, or they permit the upper edge portion of the upholstered back to move longitudinally or otherwise, undesirably, and to become distored under ordinary operating conditions.

The present invention therefore contemplates the provision of a prefabricated relatively inexpensive one piece sinuous wire spring, doubled in part on itself at its upper end portion and there interlaced with the main body portion, and provided with a yieldable supporting extension inexpensively secured to the main body portion, thereby to attain a firm support where required, with a soft undistortable cantilever end edge, without the need for separate reinforcement or for fastening clips to hold such reinforcement, but having the advantages of a one piece spring with the additional advantages of a reinforced spring.

The various objects of the invention will be clear from the following description and from the drawings, in which.

Figure 1:
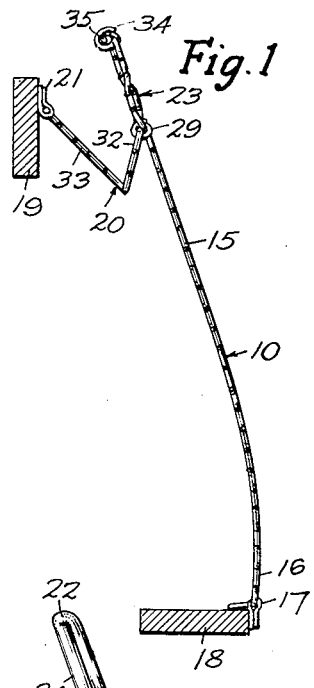
Fig. 1 is a side elevational view of the improved spring as it appears in its operative stressed position installed in the frame of an article of furniture.

In the practical example of the invention illustrated, the spring 10 is of the usual sinuous wire type wherein the series of right hand and left hand bends as 11 and 12 in the respective opposite edges of the spring are integrally joined by substantially straight crossbars as 13 and 14. The spring is preferably and usually given a permanent set in an arc of lesser radius than that of the arc into which the spring is straightened when in use. As shown in Fig. 1, the spring is partly straightened and so supported when not loaded, as to provide a substantially straight but quite yieldable main body portion 15 and a convex relatively stiff lower portion 16 secured as by a clip 17 to the frame part 18. It will be understood however, that the spring may be shaped as desired, convex, concave, flat or combinations thereof, by properly positioning the clips and the frame parts and otherwise. The upper portion of the spring is in the form of a cantilever in forwardly spaced relation to the frame part 19 and is yieldingly supported by the V-extension 20 suitably secured as by the clip 21 to said frame part 19.

Figure 2:
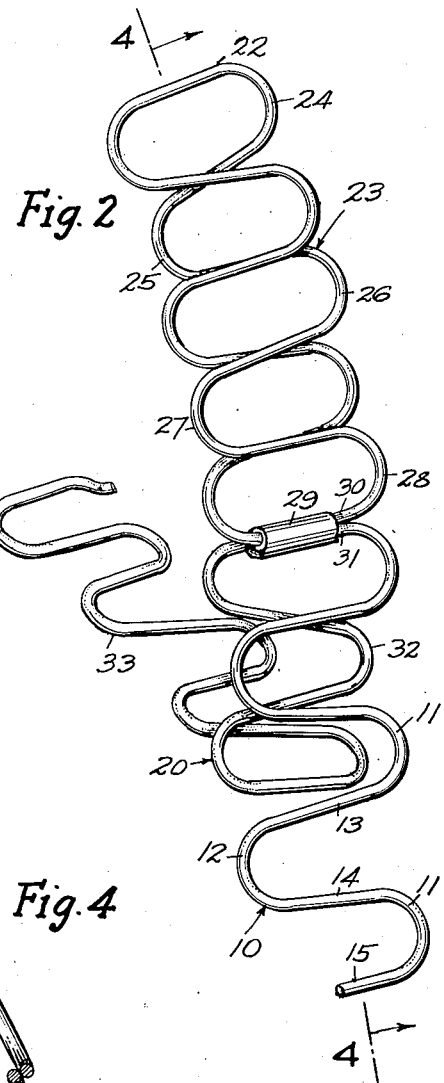
Fig. 2 is a fragmentary perspective view of the upper portion of the spring.
Figure 3:
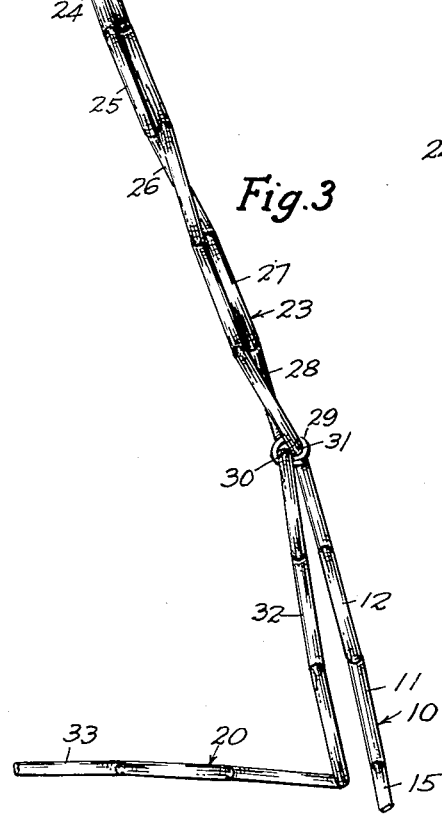
Fig. 3 is a side elevational view of Fig. 2.
Figure 4:
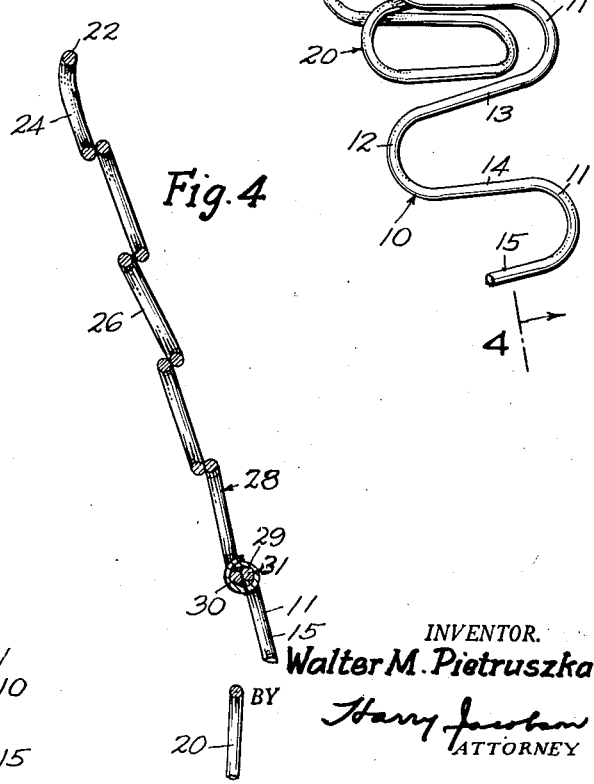
Fig. 4 is a vertical sectional view thereof taken on the line 4—4 of Fig. 2.

An important feature of the invention is the attainment of an uppermost reinforced cantilever portion on the spring, relatively stiff and not distortable longitudinally any undue amount under ordinary conditions of use, but quite free and yieldable laterally. There is consequently secured inexpensively, the desirable soft edge on the upholstered back, while selected portions of the spring are made easily yieldable and others relatively stiff without the need for separate reinforcing members or members of wire of different gauges. As best seen in Figs. 2 and 3, an intermediate part 23 of the body portion 15 near the upper end of the spring is doubled back on itself by a suitable twist in one of the crossbars as 22 to make said crossbar the uppermost end edge of the spring and common to the body portion and the doubled back part. A number of bends as 24, 25, 26, 27 and 28 of the doubled back part 23 are interlaced with the main body portion. For example, the bends 24 and 25 and the crossbars connecting said bends are arranged rearwardly of and at one face of the main body portion 15, while the bends 26, 27 and 28 and their connecting crossbars are arranged forwardly of and at the other face of the body portion of the spring.

Such doubling and interlacing of the end spring portions bring the adjacent intersecting crossbars of the portions 15 and 23 into firm pressed contact with each other at the intersections thereof, thereby to stiffen the entire upper end part of the spring in much the same manner as though a heavier gauge wire were employed for said portion. To insure the action of the interlaced portions 23 and 15 as a unitary cantilever in the manner above described, a single clip as 29 secures the lowermost crossbar of the doubled back part 23 to the adjacent crossbar 31 of the body portion 15, said clip being the only one needed in the spring. Preferably, the loops 25, 26, 27 and 28 are arranged at the open spaces in the respective edges of the body portion between the crossbars 11 and 12 thereof so as to close said spaces.

The part 23 is continued past the clipped crossbar 30 at the lowermost end thereof to extend past the clip 29 and behind the body portion 15 and to form the V-extension 20. In said extension, and when the spring is unstressed, one arm 32 is substantially parallel to and spaced somewhat from the body portion and the other arm 33 extends rearwardly and approximately perpendicularly to the arm 32, the extension being substantially coplanar with the body portion. The crossbar 30 at the lower end of the part 23 and at the upper end of the arm 32 is common to the doubled back part and said arm. When the spring is installed in a back, the end of the arm 33 is secured to the frame part 19 either rigidly or pivotally as may be found convenient and the lower end of the body portion 23 also secured either rigidly or pivotally to the frame part 18. As shown the clips 21 and 17 form pivotal connections, but as is well known, either end may be driven directly into the frame or otherwise rigidly secured thereto. The positions of the frame parts and clip determine to a large extent, the shapes and positions assumed by the spring parts, Fig. 1 showing the V-extension raised out of its normal unstressed position and the body part partly straightened.

It will be noted that the doubled back part 23 acts as a cantilever movable easily as a unit laterally about the clip 19 as a fulcrum, but is itself resistant to bending between its free end 22 and the clip. Furthermore, the span of the body portion 15 is decreased by the arrangement of the clip 19 below the upper end 22 of the spring, said clip being urged away from the frame by the V-extension. The body portion is thereby somewhat stiffened as compared to a spring of the same length and supported as usual only at its extreme ends. As is well understood, a series of springs 10 are transversely spaced apart to form the back, the free uppermost ends of the series being suitably connected if desired, by a suitable border wire 35 held by the clips 34 to the end crossbars 22 of the springs.

It will now be seen that by the use of a single spring having part thereof intermediate its ends doubled back on the body portion and interlaced therewith and continued integrally into a V-extension, the various objects of the invention are adequately and economically attained with the advantages of a spring reinforced by separate members secured thereto and of the same or different gauge, together with the advantages of a one piece structure.

While certain specific embodiments of the invention have herein been shown and described, various obvious changes may be made therein without departing from the spirit of the invention defined by the appended claims.

I claim:

1. A one piece sinuous wire spring having two thicknesses of wire extending inwardly from one end of the spring toward the other end, corresponding portions of said thicknesses being coextensive and self-urged into mutual pressed contact, and means securing the thicknesses together, said thicknesses continuing past said means and diverging, said corresponding portions of the thicknesses being interlaced, and the securing means comprising a single clip.

2. A spring having a body portion and an upper end portion and comprising a single length of wire bent into sinuous form to provide edge bends connected by crossbars, part of the upper end portion intermediate of the length of wire being doubled back on to the body portion and interlaced therewith, said upper end portion continuing in approximately the same general direction past the doubled back part in the form of a V-extension having one branch adjacent and in spaced relation to the body portion and a second branch approximately perpendicular to said one branch, and means securing the lowermost crossbar of the doubled back part to an adjacent crossbar of the body portion.

3. The spring of claim 2, the bends of the doubled back part being arranged opposite the respective non-corresponding bends of the body portion, there being a crossbar common to the doubled back part and the body portion constituting the uppermost end edge of the spring, the means securing the doubled back part to the body portion comprising a clip arranged at the lowermost crossbar of the doubled back part.

4. A one piece sinuous wire spring having a body portion and an end portion provided with a part doubled back on the body portion, means securing the body portion and the doubled back part together at a point spaced inwardly from both ends of the spring, and an extension on the doubled back part projecting rearwardly from said point, different sections of the doubled back part being on the respective opposite faces of the body portion whereby said part and body portion are interlaced and in pressed contact and function as a unitary cantilever.

5. A one piece sinuous wire spring having a body portion and an end portion provided with a part doubled back on the body portion, means securing the body portion and the doubled back part together at a point spaced inwardly from both ends of the spring, and an extension on the doubled back part projecting rearwardly from said point, the extension being V-shaped and having a free end, the other end of the extension being common to the extension and the doubled back part and being secured to the body portion by the securing means, the upper end edge of the body portion constituting the upper end edge of the doubled back part, said part and body portion being interlaced, and the securing means being a single clip engaging said common end of the extension and of the doubled back part, and also engaging the body portion.

References Cited in the file of this patent

UNITED STATES PATENTS

| Re. 22,461 | Kronheim | Mar. 28, 1944 |
| 2,800,167 | Winkler | July 23, 1957 |

FOREIGN PATENTS

| 974,060 | France | Sept. 27, 1950 |